(12) United States Patent
Subramaniam et al.

(10) Patent No.: US 11,023,646 B2
(45) Date of Patent: Jun. 1, 2021

(54) HIERARCHICAL CLOCK TREE CONSTRUCTION BASED ON CONSTRAINTS

(71) Applicant: Samsung Electronics Co., Ltd., Suwon-si (KR)

(72) Inventors: Sridhar Subramaniam, San Jose, CA (US); Hongda Lu, Austin, TX (US); Kok-Hoong Chiu, Austin, TX (US)

(73) Assignee: SAMSUNG ELECTRONICS CO., LTD.

(*) Notice: Subject to any disclaimer, the term of this patent is extended or adjusted under 35 U.S.C. 154(b) by 0 days.

(21) Appl. No.: 16/664,791

(22) Filed: Oct. 25, 2019

(65) Prior Publication Data
US 2020/0401179 A1    Dec. 24, 2020

Related U.S. Application Data

(60) Provisional application No. 62/863,260, filed on Jun. 18, 2019.

(51) Int. Cl.
| | | |
|---|---|---|
| *G06F 1/10* | (2006.01) | |
| *G06F 30/396* | (2020.01) | |
| *G06F 1/08* | (2006.01) | |
| *G06F 30/30* | (2020.01) | |
| *G06F 30/392* | (2020.01) | |
| *G06F 30/394* | (2020.01) | |
| *G06F 30/398* | (2020.01) | |

(Continued)

(52) U.S. Cl.
CPC .............. *G06F 30/396* (2020.01); *G06F 1/08* (2013.01); *G06F 1/10* (2013.01); *G06F 30/30* (2020.01); *G06F 30/3312* (2020.01); *G06F 30/392* (2020.01); *G06F 30/394* (2020.01); *G06F 30/398* (2020.01); *G06F 2119/12* (2020.01)

(58) Field of Classification Search
CPC ... G06F 1/04; G06F 1/10; G06F 30/30; G06F 30/3312; G06F 30/392; G06F 30/394; G06F 30/396; G06F 30/398
USPC .................................................. 327/564, 565
See application file for complete search history.

(56) References Cited

U.S. PATENT DOCUMENTS

| | | |
|---|---|---|
| 6,751,786 B2 | 6/2004 | Teng et al. |
| 6,845,494 B2 | 1/2005 | Burks et al. |

(Continued)

FOREIGN PATENT DOCUMENTS

WO    2007102887 A2    9/2007

*Primary Examiner* — William Hernandez
(74) *Attorney, Agent, or Firm* — Renaissance IP Law Group LLP

(57) ABSTRACT

A method of automatically constructing a hierarchical clock tree for an integrated circuit may include constructing a global clock tree on a first level based on first-level constraints, pushing the global clock tree to partitions on a second level, and generating second-level constraints for the partitions on the second level. The second-level constraints may be included in configuration files that may be generated for the partitions on the second level. The first-level constraints may be included in a first-level configuration file that is user-modifiable. The second-level constraints may include information for replicating multiple instantiated partitions on the second level. The method may further include modifying terminal names and/or configurations after pushdown. The method may further include creating infrastructure to analyze timing of the global clock tree.

20 Claims, 16 Drawing Sheets

(51) Int. Cl.
  *G06F 30/3312* (2020.01)
  *G06F 119/12* (2020.01)

(56) References Cited

U.S. PATENT DOCUMENTS

| | | |
|---|---|---|
| 7,467,367 B1 | 12/2008 | Li et al. |
| 7,669,160 B2 | 2/2010 | Furnish et al. |
| 8,365,113 B1 * | 1/2013 | Bhardwaj ............... G06F 30/30 716/106 |
| 8,719,743 B1 | 5/2014 | Kollaritsch et al. |
| 2013/0047127 A1 | 2/2013 | Krunachalam |
| 2020/0334406 A1 * | 10/2020 | Patel, I ............... G06F 30/3947 |

* cited by examiner

HIERARCHICAL CLOCK TREE CONSTRUCTION BASED ON CONSTRAINTS

CROSS-REFERENCE TO RELATED APPLICATION

This application claims priority to, and the benefit of, U.S. Provisional Patent Application Ser. No. 62/863,260 titled "Method and Algorithm for Multilevel Hierarchical Custom Clock Tree Construction Based On Constraints" filed Jun. 18, 2019 which is incorporated by reference.

BACKGROUND

1. Field

This disclosure relates generally to physical design of clock trees for integrated circuits, and more specifically to hierarchical clock tree implementation.

2. Related Art

Clock trees are special purpose buffer trees used to distribute clock signals throughout integrated circuits. Clock trees are designed through a process that seeks to minimize latency, which is the delay from a root clock to a point of usage, and skew, which is the difference between the arrival time of a clock transition at different points on the integrated circuit. Clock trees typically consume a significant portion of the area and power budget of an integrated circuit. This affects an aspect of integrated circuit design known as power, performance, and area (PPA) which are three variables that are typically the basis for making trade-offs when optimizing integrated circuit designs. Therefore, clock trees should be designed in a manner that minimizes the area used for clock buffers and routing resources, as well as the amount of power consumed by the clock tree.

Hierarchical design is widely used in very large scale integration (VLSI) to design highly complex integrated circuits (ICs). Hierarchical design generally involves breaking a complex design into smaller physical partitions or blocks which may be easier to design individually, and then combining the blocks into a larger overall design. The blocks in hierarchical design are generally arranged in either a channel-based design or an abutted design. In a channel-based design, the blocks are separated by channels through which clock and other signals are distributed to the blocks. In abutted or channel-less design, the blocks are placed next to each other with no space between them. Abutted designs are generally considered to be more efficient in terms of area.

Clock trees for hierarchical designs are typically divided into global portions and local portions. A global portion includes a global clock tree (GCT) that distributes a clock signal from a clock source or root to endpoints that are located throughout all or a portion of the integrated circuit, for example at each block. A local portion typically includes multiple local clock trees (LCTs), for example one LCT per block, which further distribute the clock signal from the endpoints of the global clock tree to the multiple points of usage throughout each block.

SUMMARY

A method of automatically constructing a hierarchical clock tree for an integrated circuit may include constructing a global clock tree on a first level based on first-level constraints, pushing the global clock tree to partitions on a second level, and generating second-level constraints for the partitions on the second level. The second-level constraints may include information for replicating multiple instantiated partitions on the second level. The method may further include modifying terminal names after pushdown. The method may further include modifying terminal configurations after pushdown. The method may further include generating configuration files including the second-level constraints for the partitions on the second level. The first-level constraints may be included in a first-level configuration file that is user-modifiable. The method may further include creating infrastructure to analyze timing of the global clock tree. Creating the infrastructure may include replicating cells and routes for multiple instance partitions. Creating the infrastructure may further include adding clock sinks near endpoints of the global clock tree. The method may further include calculating timing for the endpoints of the global clock tree based on the first-level constraints. Calculating timing for the endpoints may include calculating latency. Calculating timing for the endpoints may include calculating skew. The first level may be a top level, and the second level may be a block level. The method may be performed in a batch mode or a user-interactive mode. The method may further include pushing at least a portion of the global clock tree to one or more partitions on a third level. Constructing a global clock tree on a first level based on first-level constraints may include placing clock cells for the global clock tree on a first level based on the first-level constraints, modifying a first-level netlist to include new nets for the clock cells, and routing segments for the global clock tree based on the first-level constraints. The method may further include modifying a first-level netlist after pushdown.

A method of automatically constructing a hierarchical clock tree for an integrated circuit may include placing cells for a global clock tree on a first level based on first-level constraints, routing segments for the global clock tree on the first level based on the first-level constraints, creating clock routes for multiple instantiated partitions on a second level based on the global clock tree, pushing the global clock tree to the second level, and generating second-level constraints for the global clock tree in partitions on the second level, including the multiple instantiated partitions. Creating clock routes for multiple instantiated partitions may further include replicating route segments that cross from non-master to master partitions. Creating clock routes for multiple instantiated partitions may further include renaming route segments that cross from non-master to master partitions. Creating clock routes for multiple instantiated partitions may further include trimming route segments to prevent the route segments from passing into non-master MIM instances.

A method of constructing a hierarchical clock tree for an integrated circuit may include placing cells in based on a global clock tree distribution topology with constraints, generating routes based on the global clock tree distribution topology with constraints, pushing the cells and routes from a first level to partitions on a second level, and implementing the global clock tree on the second level using engineering change orders (ECOs). The method may further include modifying one or more netlists to reflect changes made for pushing the cells and routes from the first level to the partitions on the second level. The method may further include, creating and renaming terminals at the second level, and generating terminal files for implementing the global clock tree in the partitions on the second level. The method may further include saving the pushed down cells and routes in EGO files.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. The accompanying drawings, together with the specification, illustrate example embodiments of the present disclosure, and, together with the description, serve to explain the principles of the present disclosure.

DETAILED DESCRIPTION

Figure 1:
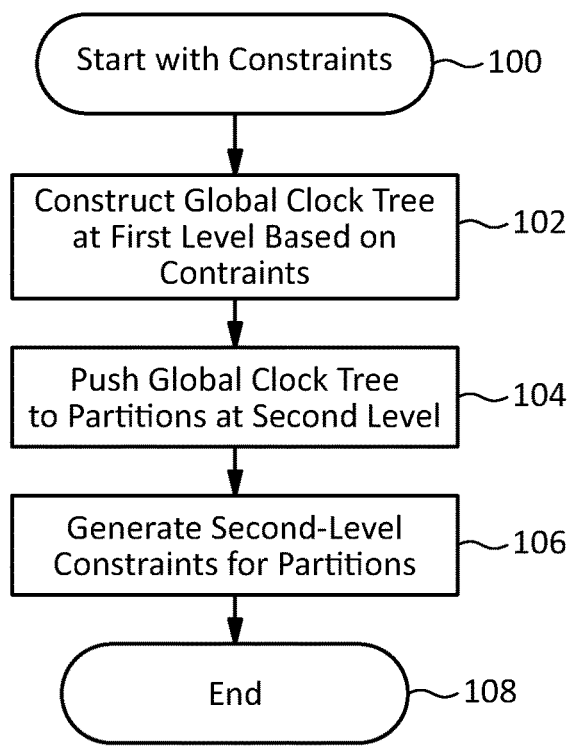
FIG. 1 illustrates an embodiment of a method for automatically constructing a hierarchical clock tree for an integrated circuit according to this disclosure.

Constructing global clock trees for hierarchical designs may be relatively difficult compared to local clock trees. Local clock trees may be designed using conventional techniques such as clock tree synthesis (CTS) or clock mesh structures. It may be possible to use CTS to design a global clock tree for a channel-based hierarchical design, but CTS may not work for abutted hierarchical designs.

It may be possible to use a clock mesh structure for a global clock tree in an abutted design, but clock mesh design and workflows tend to be complicated and time consuming. For example, clock mesh design may involve extensive circuit simulation, timing back annotation, and turn over time. Moreover, the relatively high power consumption of clock mesh structures, which may be tolerable at the local level, may become excessive at the global level.

Other clock tree topologies such as H-tree and binary tree may be suitable for global clock trees in abutted designs. However, the tools that are available for designing these specific tree topologies are invariably manual, which may be time consuming and expensive.

Constructing a general clock buffer tree may provide a more straightforward way of creating a global clock tree for a hierarchical design with an abutted floorplan. However, this may involve manually placing and routing buffers which may be time consuming. Moreover, the global clock tree may need to be modified based on the floorplan data and the netlist (sequential gates and clock gaters placement distribution), both of which may vary based on the design iteration.

The principles of this disclosure may provide an automated process for constructing a global clock tree for a hierarchical design using a general clock buffer tree topology. In one example embodiment, an automated method according to this disclosure may begin by constructing a global clock tree based on top-level constraints that may be provided, for example, in a configuration file. The global clock tree may be constructed on the top-level of a design having a floorplan with abutted blocks. The global clock tree may then be pushed down to the block level where block-level constraints for the pushed-down global clock tree may be generated for each of the blocks. The block-level constraints may be included, for example, in configuration files for each of the blocks. The block-level constraints may enable the placement and routing of the global clock tree to be reproduced at the block level. This may be useful, for example, during later phases of physical design such as block-level CTS, routing, timing analysis, validation, etc., in the normal workflow of physical design.

In some embodiments, additional features may provide techniques for handling details and issues that arise before, during and after pushdown. For example, the disclosed techniques may involve handling multiple instantiated modules (MIMs) or other multiple instantiated partitions which may be common in abutted floorplans and may pose a key challenge in creating global clock trees for abutted designs. Other disclosed techniques may involve reconfiguring and/or renaming terminals, modifying clock netlists, identifying drivers, creating blockages for cell placements and routes, and the like. Yet more disclosed techniques may provide infrastructure and methods for analyzing timing of the global clock tree.

By providing an automated process for constructing a global clock tree, the principles of this disclosure may reduce the time and cost required to design a hierarchical clock tree, and may also result in designs that are more predictable and reproducible. Moreover, the use of user-modifiable configuration files and/or an interactive mode may provide a simple and easily accessible user interface for a clock tree designer to maintain manual control over the automated process.

Although the embodiment disclosed above and others disclosed below may be described in the context of designs in which a global clock tree is constructed on a top-level and pushed down to a block-level, the principles of this disclosure are not limited to these or any other implementation details. For example, a global clock tree may be constructed on any level and pushed, in whole or in part, to any other level, or multiple levels, above or below the first level. The global clock tree may be pushed to one or more levels having any type of partition including blocks, subblocks, modules, etc., and including any type of multiple instantiated partitions.

FIG. 1 illustrates an embodiment of a method for automatically constructing a hierarchical clock tree for an integrated circuit according to this disclosure. The method begins at starting point 100 where the method is provided with first-level constraints for a global clock tree. At process 102, a global clock tree is constructed on the first level based on the first-level constraints. At process 104, the global clock tree is pushed to partitions on a second level. At process 106, second-level constraints are generated for the partitions on the second level. The second-level constraints may include, for example, information for replicating multiple instantiated partitions on the second level. The process terminates at ending point 108.

Figure 2:
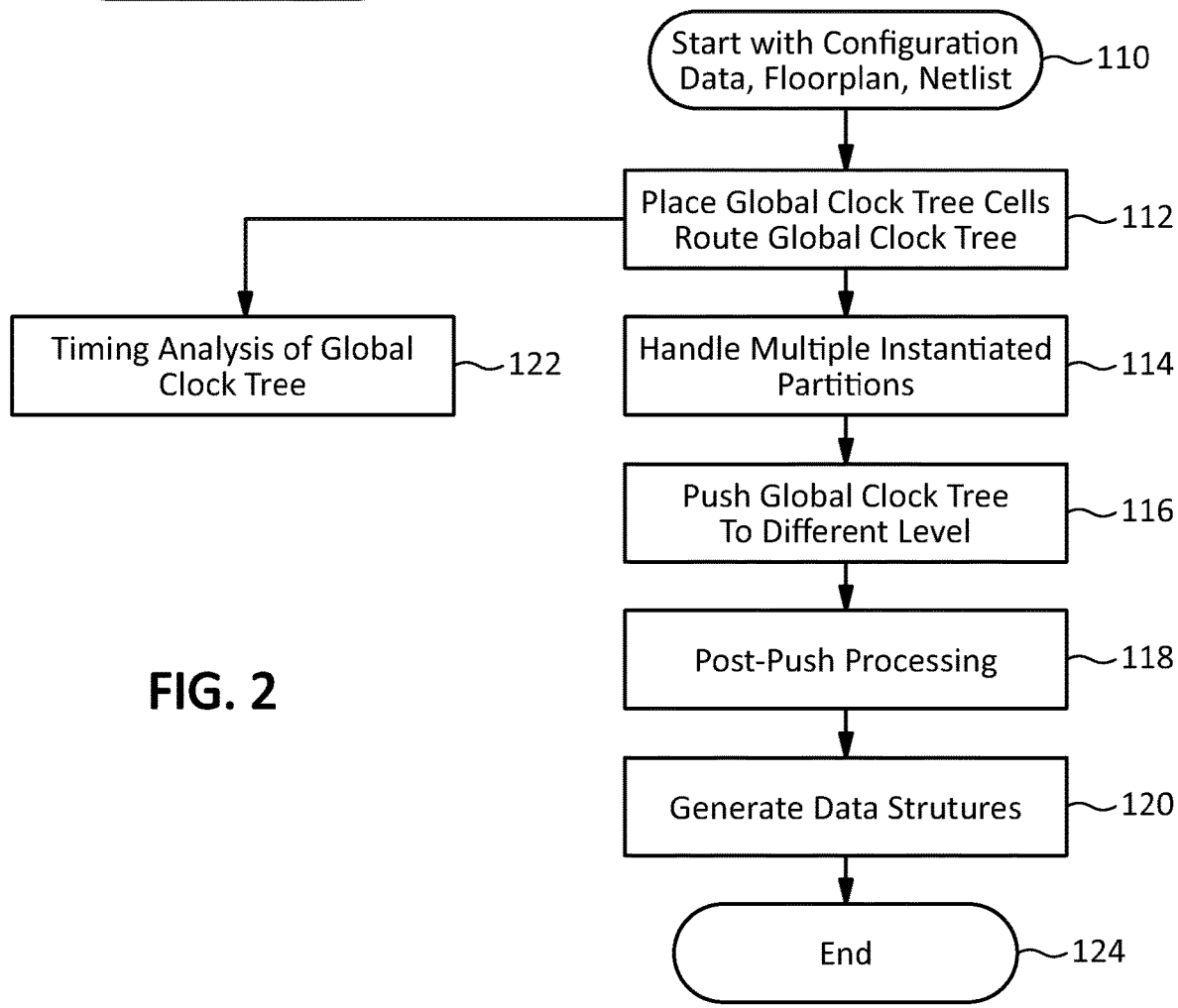
FIG. 2 illustrates another embodiment of a method for automatically constructing a hierarchical clock tree for an integrated circuit according to this disclosure.

FIG. 2 illustrates another embodiment of a method for automatically constructing a hierarchical clock tree for an integrated circuit according to this disclosure.

The method begins at starting point 110 where the method is assumed to have access to one or more data structures such as files that have information about a distribution topology for the global clock tree, a floorplan for the integrated circuit, a global netlist for the integrated circuit, and/or constraints for the global clock tree. At process 112, construction of the global clock tree may begin with placement of cells such as buffers and/or inverters and routing of segments such as spines and/or branches. The placement and routing may be based on the constraints specified in the data structures. In some implementations, placement and routing may be omitted in one or more partitions that are not master instances of multiple instantiated partitions, and the placement and routing in master instances may be replicated for the corresponding non-master instances.

Some implementations may include a process 122 which may perform timing analysis of the global clock tree. This may be accomplished, for example, by creating an infrastructure for timing analysis through placement and routing, possibly on a temporary basis, of cells and segments in one or more partitions that are not master partitions. Clock sinks such as flip-flops or other sequential logic loads may be added at some or all of the endpoints of the global clock tree for which timing analysis is to be performed. Timing results such as latency and/or skew may then be calculated or measured for the endpoints, including endpoints that may eventually be located in non-master instances of partitions. The timing may be calculated or measured for various process, voltage and temperature (PVT) corners, as well as various operating scenarios and/or operating modes. The results of the timing analysis may be used by other design process and/or phases such as balancing work on the global clock tree individually or in combination with balancing work on partition clock trees that may extend from the endpoints of the global clock tree, as well as timing closure, signal integrity analysis, physical verification, and/or other design process and/or phases.

Some implementations may include a process 114 including one or more techniques for handling various clock cell placements, clock routing, and other issues that may be encountered when multiple instantiated partitions are pushed from one level to another. For example, these techniques may include replicating clock routes to multiple instantiated partitions, clock driver identification, net renaming, and/or route trimming.

At process 116, the global clock tree may be pushed from a first level to a second level, for example, from a top level to a block level. During this process, cells and routes associated with the first level may become logically and/or physically associated with the second level for final physical design.

Process 118 may include one or more types of post-push handling techniques. These may include, for example, creating abutting terminals where routes cross boundaries between partitions, handling terminal naming issues, and legalizing positions of cells.

At process 120, various data structures such as files may be created or modified to enable the results of the method of FIG. 2 to be used by other design process and/or phases. Examples of the data structures include terminal files which may be created for some or all partitions, configuration files which may be created for some or all partitions, engineering change order (EGO) files which may be created to reflect changes to the first and second level netlists in a final results database, and/or placement and routing blockages which may be included in the final results database. In some implementations, data structures such as files may be created or modified only for master instances of multiple instantiated partitions because the data for the master instances may be replicated for the non-master instances. The method then ends at end point 124.

The method of FIG. 2 may generally be highly automated, but the automation may also be fully or partially controlled manually by a user through various access points. For example, the input data structures at starting point 110 may include one or more user-modifiable configuration files having user-specified constraints such as buffer placement and/or routing. The method of FIG. 2 may be implemented as a "single-step" solution with all processes being initiated by a batch file containing commands that cause one or more electronic design automation (EDA) tools to execute each process. Alternatively, it may be implemented in an interactive mode in which a user issues each command individually (or "steps through" a batch file), which may allow the user to explore clock tree configurations, make customizations, and/or make trade-offs during the process.

Figure 3:
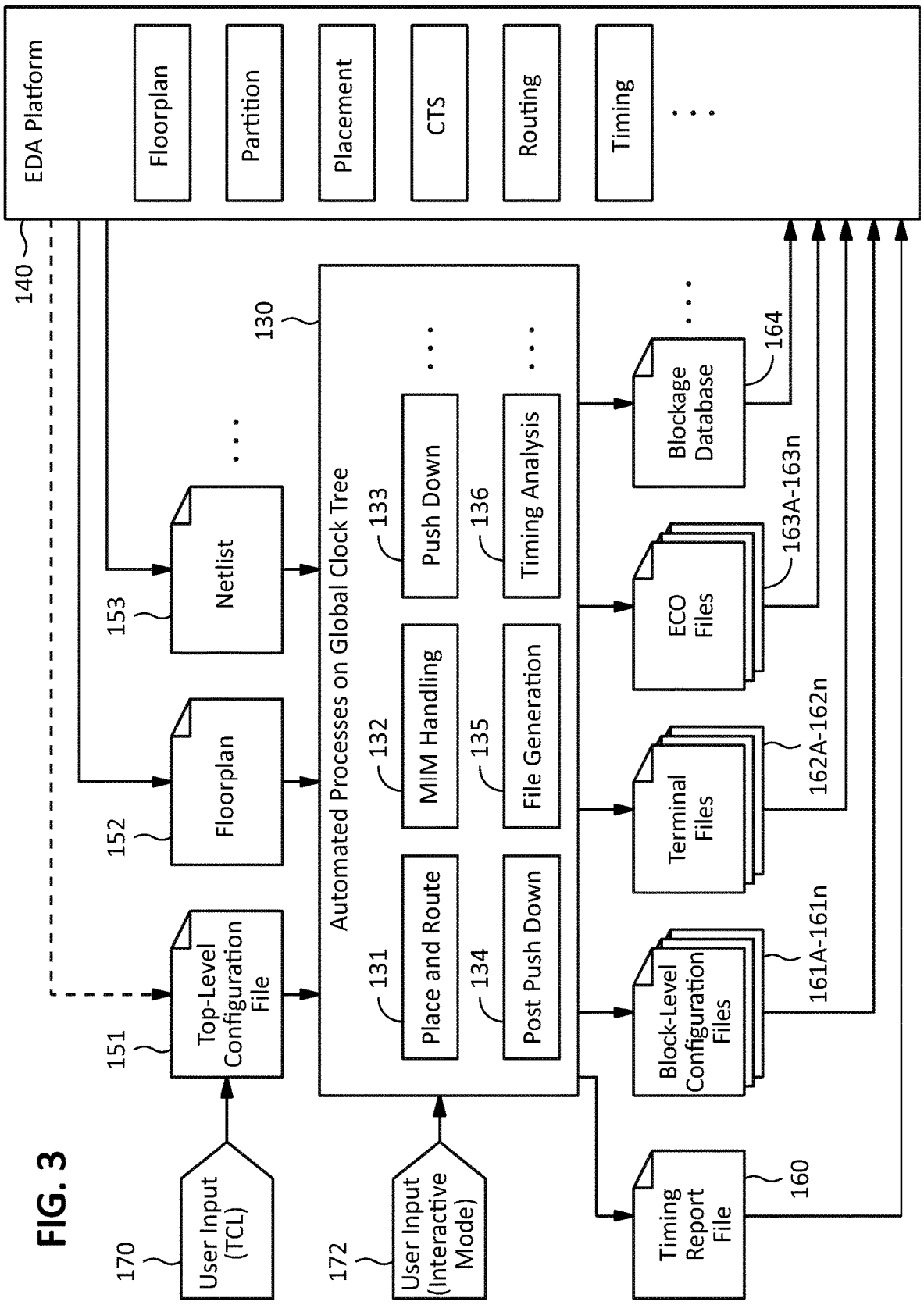
FIG. 3 illustrates an input/output flow for an embodiment of a method for constructing a hierarchical clock tree for an integrated circuit according to this disclosure.

FIG. 3 illustrates an input/output flow for an embodiment of a method for constructing a hierarchical clock tree for an integrated circuit according to this disclosure. The input/output flow of FIG. 3 may be used, for example, to implement the methods of FIG. 1 or 2, but none of the embodiments of FIGS. 1, 2 and 3 are limited by or to the others. The input/output flow of FIG. 3 is illustrated in conjunction with an EDA platform 140 on which any or all of the workflow may be implemented, but the input/output flow of FIG. 3 is not limited to implementation on any particular platform. The EDA platform 140 may include integrated circuit design tools that may perform conventional functions for physical design including floorplanning, partitioning, placement, clock tree synthesis, routing, timing analysis, etc. In some implementations, some or all of the input/output flow shown in FIG. 3 may be performed separately from the EDA platform 140. In other implementations, some or all of the input/output flow shown in FIG. 3, as well as some or all of the methods of FIGS. 1, 2 and/or any of the other methods, workflows, processes, and the like may be integrated into one or more tools of the EDA platform 140 or any other suitable design platform and/or tools.

In the embodiment of FIG. 3, automated processes 130 may receive input data in the form of files 151, 152, 153, etc., and generate output data in the form of files 161A-161n, 162A-162n, 163A-163n, 164, etc. The automated processes 130 may include, for example, a process 131 to place clock cells and route spine, branch, and/or other segments for a global clock tree, a process 132 to handle preparations for pushing multiple instantiated modules or other partitions between levels, a process 133 to handle pushing the global clock tree to a different level, a process 134 to handle post-push processing, and a process 135 to generate the output data in the form of files 161A-161n, 162A-162n, 163A-163n, 164, etc.

Another process 136 may create infrastructure for, and/or perform, timing analysis of the global clock tree, while another file 160 may include timing analysis report data generated by the process 136.

File 151 may be implemented as a configuration file that may include user-specified constraints such as clock tree cell type, topology information on the global clock tree, tree definitions that may be used to create or modify net lists for clock buffers, and placement information for clock cells. In some embodiments, the configuration file may only include information for the master instance of each multiple instantiated partition since the information for the other non-master instances may be replicated from the master instance. As an example, the configuration file 151 may be implemented as a tool command language (TCL) file which may be human readable and easy to modify, which may thereby provide a simple user interface. The configuration file 151 may be created specifically for the process of FIG. 3, or it may be modified from a configuration file that was created for other purposes as well. Although shown as a top-level configuration file, it may include constraints for a global clock tree on any logical level.

File 152 may include floorplan information for an entire integrated circuit or for any portion for relating to the global clock tree referenced in the configuration file 151. The floorplan information may include the arrangement of partitions such as blocks and subblocks, multiple instantiated partitions such as multiple instantiated modules (MIMs), multiple instantiated blocks (MIBs), macro locations inside partitions, and the like. For convenience, the term MIM may be used herein to refer to any multiple instantiated partition including multiple instantiated modules, multiple instantiated blocks, etc.

File 153 may include netlist information for the global clock tree distribution including sequential gates and clock gater cells.

Files 161A-161n may be implemented as individual configuration files for each block or other partition into which a portion of the global clock tree may be pushed. In some implementations, the individual configuration files may only be generated for master instances of multiple instantiated blocks or other partitions, since the information may be replicated for the non-master instances. These configuration files may include constraints such as cell placement, routing, layer information, etc., that may be used to reproduce the global clock tree at the block or other partition level.

Files 162A-162n may include engineering change orders (ECOs) that may be used to modify top-level and block-level netlists and/or create block ports and/or terminals. In some embodiments, these EGO files may be utilized for saving pushed down clock cell placement and routing data as an alternative to the configuration files.

Any of the data structures including files described herein, may be implemented using any suitable data or file format. In some embodiments and/or implementations, however, it may be especially beneficial to an interpreted language that may support scripting such as tool command language (TCL).

User interface 170 may be implemented in any suitable way that enables a clock tree designer to create, modify, or otherwise manipulate the constraints that are provided to the automated processes 130, including any constraints that may be included in the top-level configuration file 151. The user interface 170 may take the form of a word processor or other text editing tool to manipulate the contents of a TCL or other type of file. The User interface 170 may be separate from, or integral with, the EDA platform 140, and may also be used to initiate a batch-mode operation of any of the processes 130. The user interface 170 may also be used to manipulate the constraints and/or other contents of the block-level configuration files 161A-161n, as well as any of the other files and/or data structures of FIG. 3 or any of the other embodiments of this disclosure.

Another user interface 172 may implemented in any suitable way that enables a clock tree designer to interact with the automated processes 130, for example in real-time as the processes are executing. This may enable the designer to halt any or all of the processes to change one or more constraints or other parameters, to re-run one or more of the processes, to explore clock tree configurations, to make any trade-offs, and any other task that may help the designer better control the automated processes 130. The user interface 172 may be separate from, or integral with, the EDA platform 140, and may also be used to manipulate the constraints and/or other contents of the block-level configuration files 161A-161n, as well as any of the other files and/or data structures of FIG. 3 or any of the other embodiments of this disclosure. The user interface 172 may be separate from, or integral with, the user interface 170.

Figure 4A:
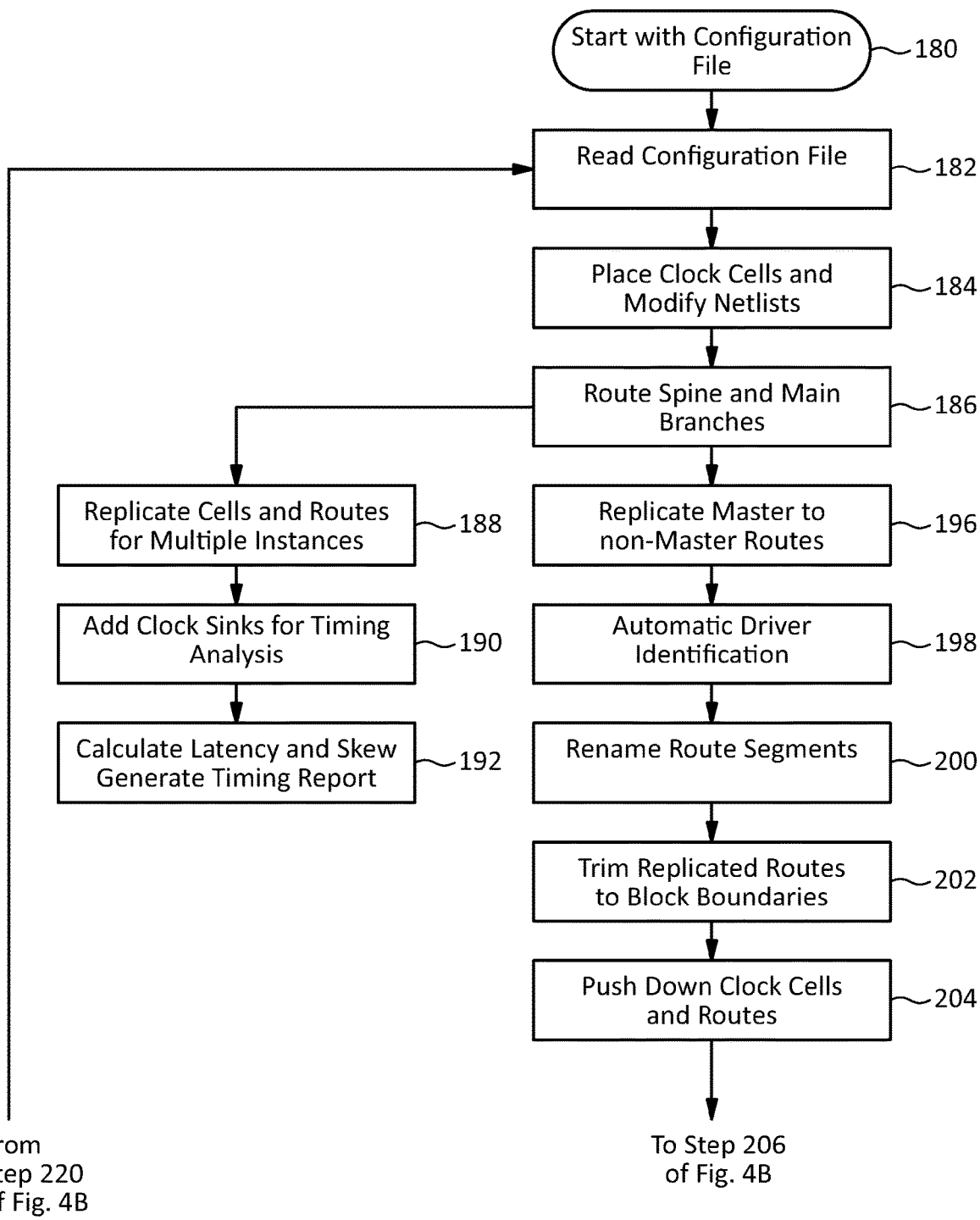
FIGS. 4A and 4B, which are referred to collectively as FIG. 4, illustrate a more detailed example embodiment of a method for automatically constructing a hierarchical clock tree for an integrated circuit according to the principles of this disclosure.
Figure 4B:
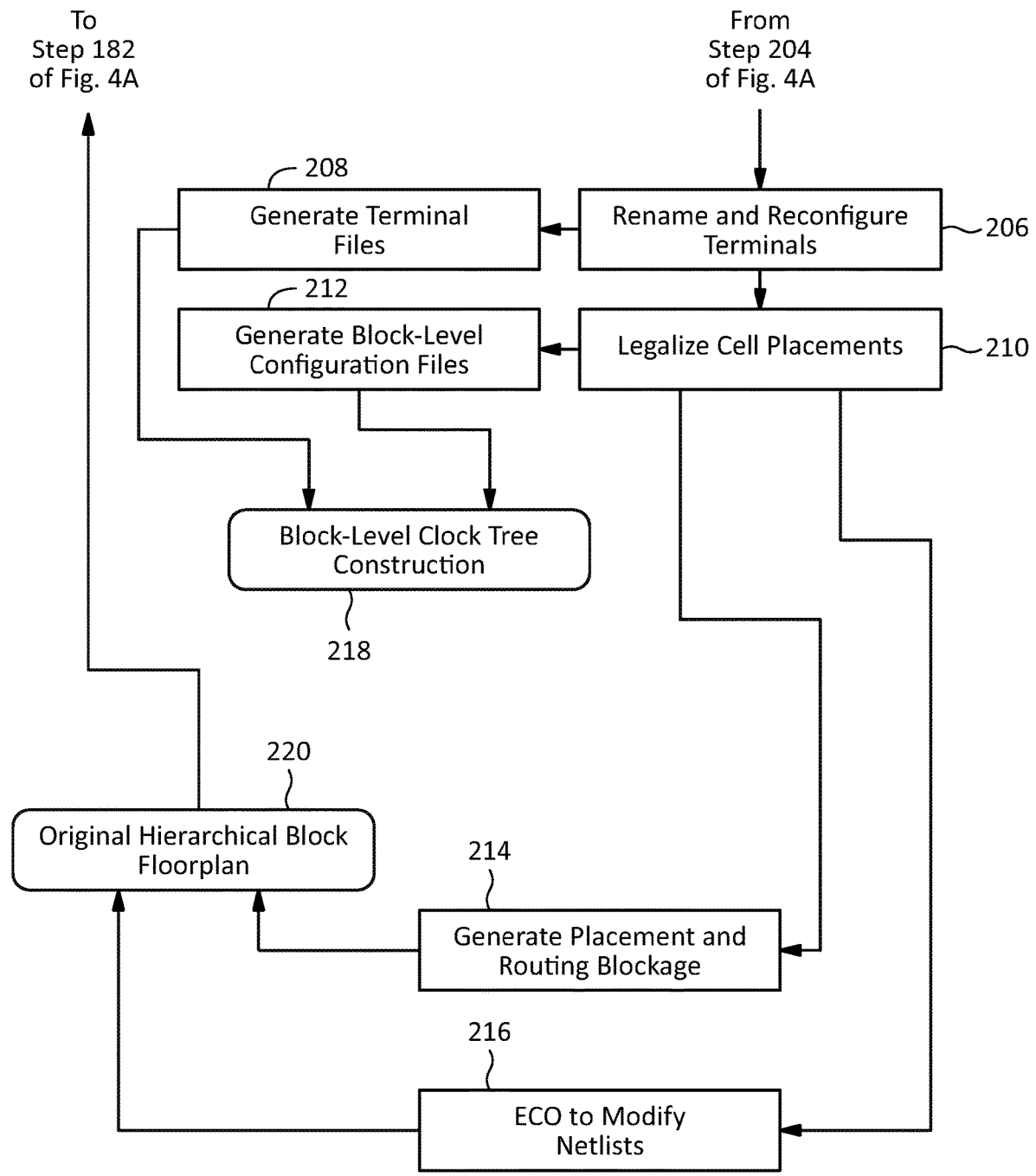

FIGS. 4A and 4B, which are referred to collectively as FIG. 4, illustrate a more detailed example embodiment of a method for automatically constructing a hierarchical clock tree for an integrated circuit according to the principles of this disclosure. The implementation details of the embodiment of FIG. 4 are provided for purposes of illustration, and the principles of this disclosure are not limited to these details.

The method of FIG. 4 may begin at starting point 180. At this point, the method is assumed to have access to a top-level configuration file that includes constraints for a top-level global clock tree. The configuration file may have been generated manually by a clock tree designer (user), by one or more tools of an EDA platform such as platform 130 in FIG. 3, or in any other manner. In this example embodiment, the configuration file may be written in tool command language (TCL), but any other suitable language may be used.

At step 182, the top-level configuration file may be read and basic checks for correctness may be performed. Data structures for building the hierarchical clock tree may be created.

Figure 5:
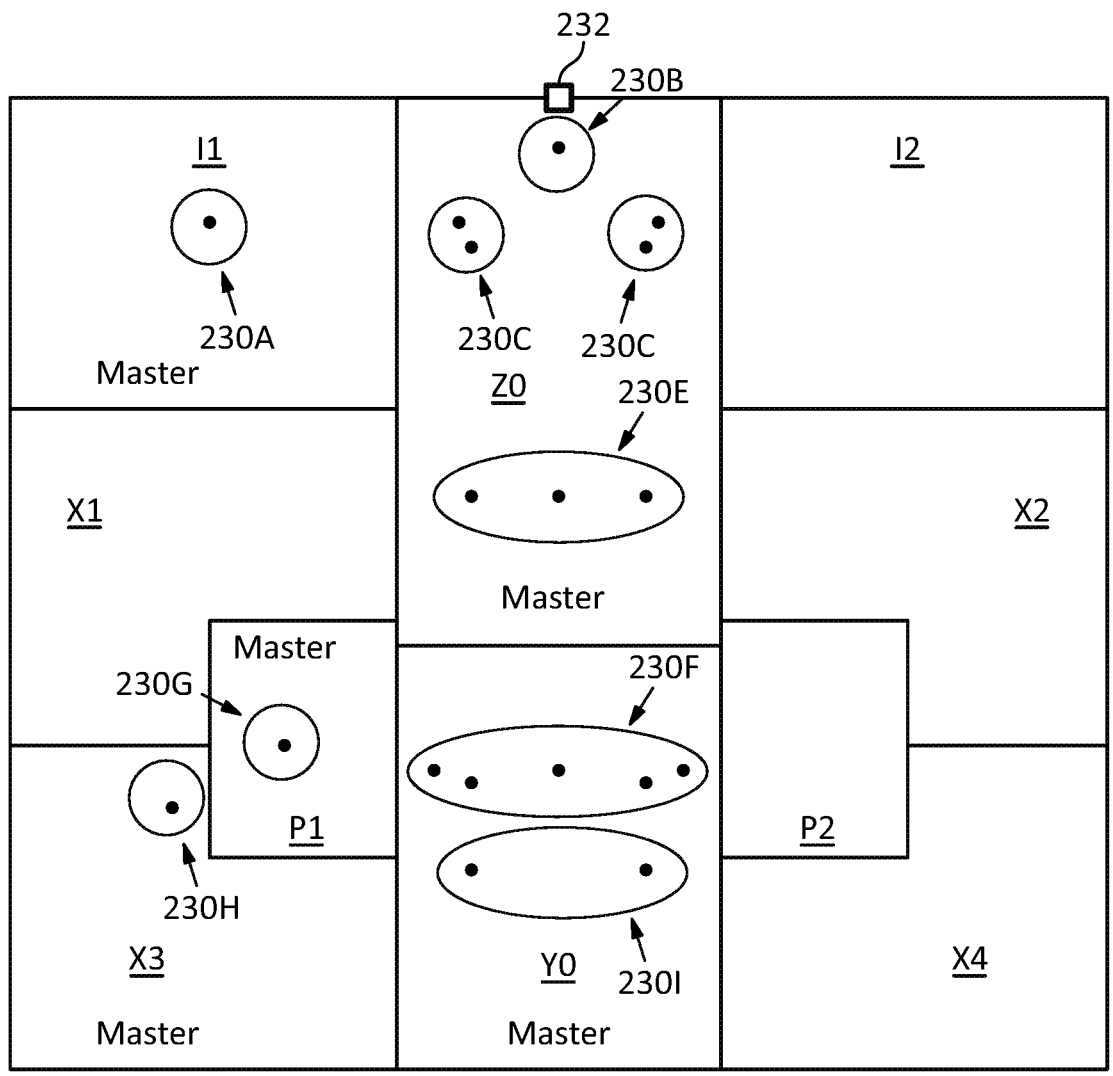
FIG. 5 which illustrates an exemplary block layout of an integrated circuit having an abutted hierarchical floorplan and clock cells placed according to this disclosure.

At step 184, tree definitions from the top-level configuration file may be used to create a netlist for the cells in the global clock tree using new nets, for example default nets, as may be needed. The top-level netlist may be modified to include any newly created nets for the global clock tree. Clock cells such as buffers and/or inverters may be placed in locations specified by the user as constraints in the top-level configuration file. Examples of cell placement locations are shown as dots in FIG. 5 which illustrates an exemplary block layout of an integrated circuit having an abutted hierarchical floorplan. The dots indicating the cell placement locations are indicated by circles and ellipses 230A, 230B, etc. which are not part of the design. FIG. 5 may not be drawn to scale, and the dots indicating the cell placements may be shown with an exaggerated size to facilitate identification.

In the example of FIG. 5, blocks Z0 and Y0 are single-instantiated blocks, while blocks I1 and I2, P1 and P2, and X1-X4 are sets of multiple-instantiated blocks, which, as mentioned above, may be referred to as MIMs for convenience. Blocks I1, P1 and X3 may be designated as the master instances of their respective sets of MIMs. Designation of master instances is another constraint that may be specified by the user in the top-level configuration file. For convenience of future reference, Z0 and Y0 may designated as non-MIM "masters" even though they may not be multiple instance blocks.

At this step of the method, the clock cells may not need to be placed at legal locations. Also at this step of the method, all instances of cells specified by the tree definition constraints may have been placed. In this embodiment, cells may only be placed over master instances of blocks, both MIM and non-MIM, because cells (and routes) for non-master instances may be implemented through replication as explained below.

Figure 6:
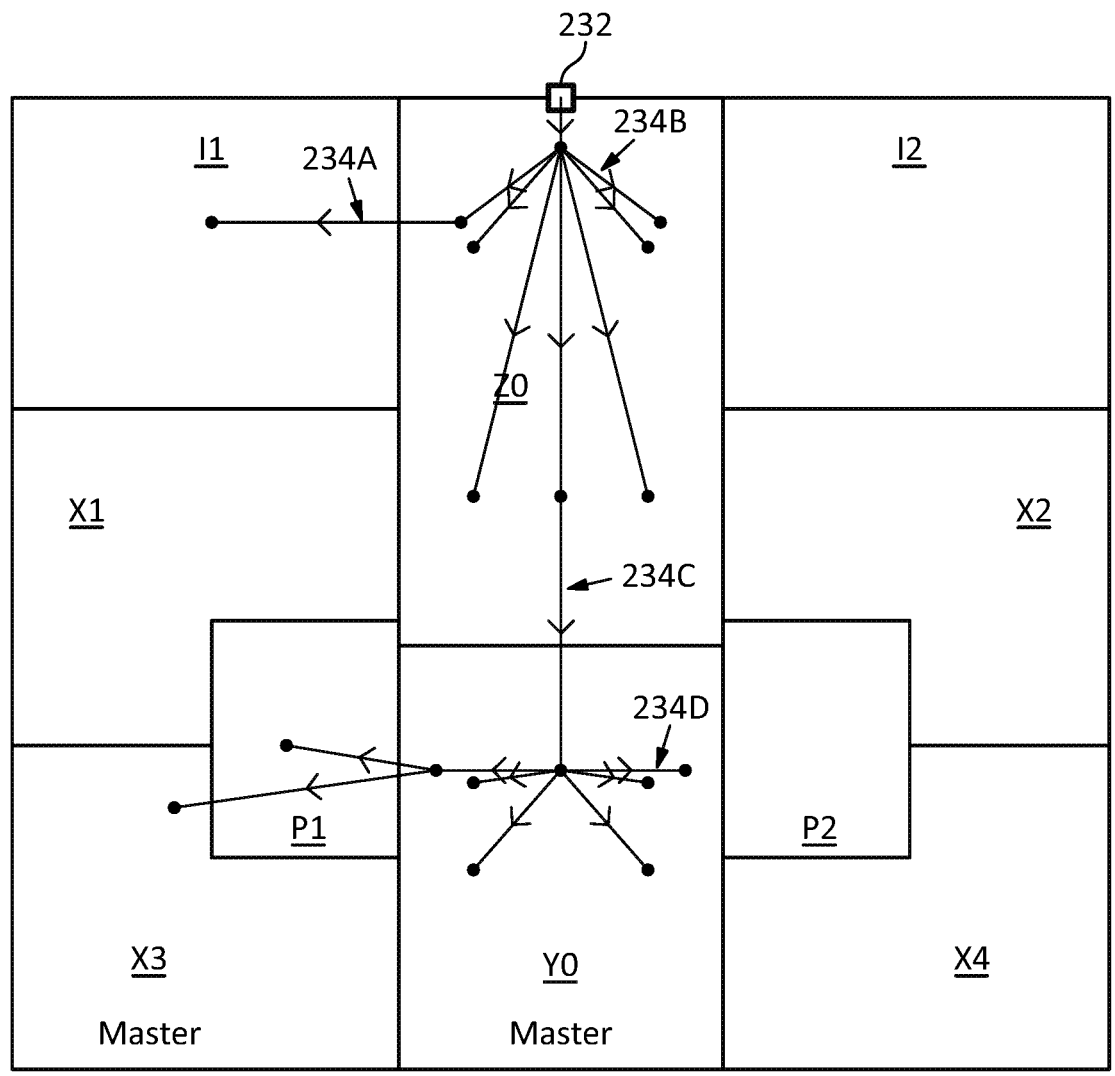
FIG. 6 illustrates the integrated circuit of FIG. 5 with flylines connecting a clock root to clock cells according to this disclosure.

FIG. 6 illustrates flylines 234A, 234B, etc., between a clock source or root 232 and all of the cells based on the tree definitions specified in the top-level configuration file. Not all of the flylines are indicated with reference numbers to prevent the drawing from becoming obscured. The flylines indicate nets that may form the netlist for the hierarchical (multi-level) global clock tree.

Figure 7:
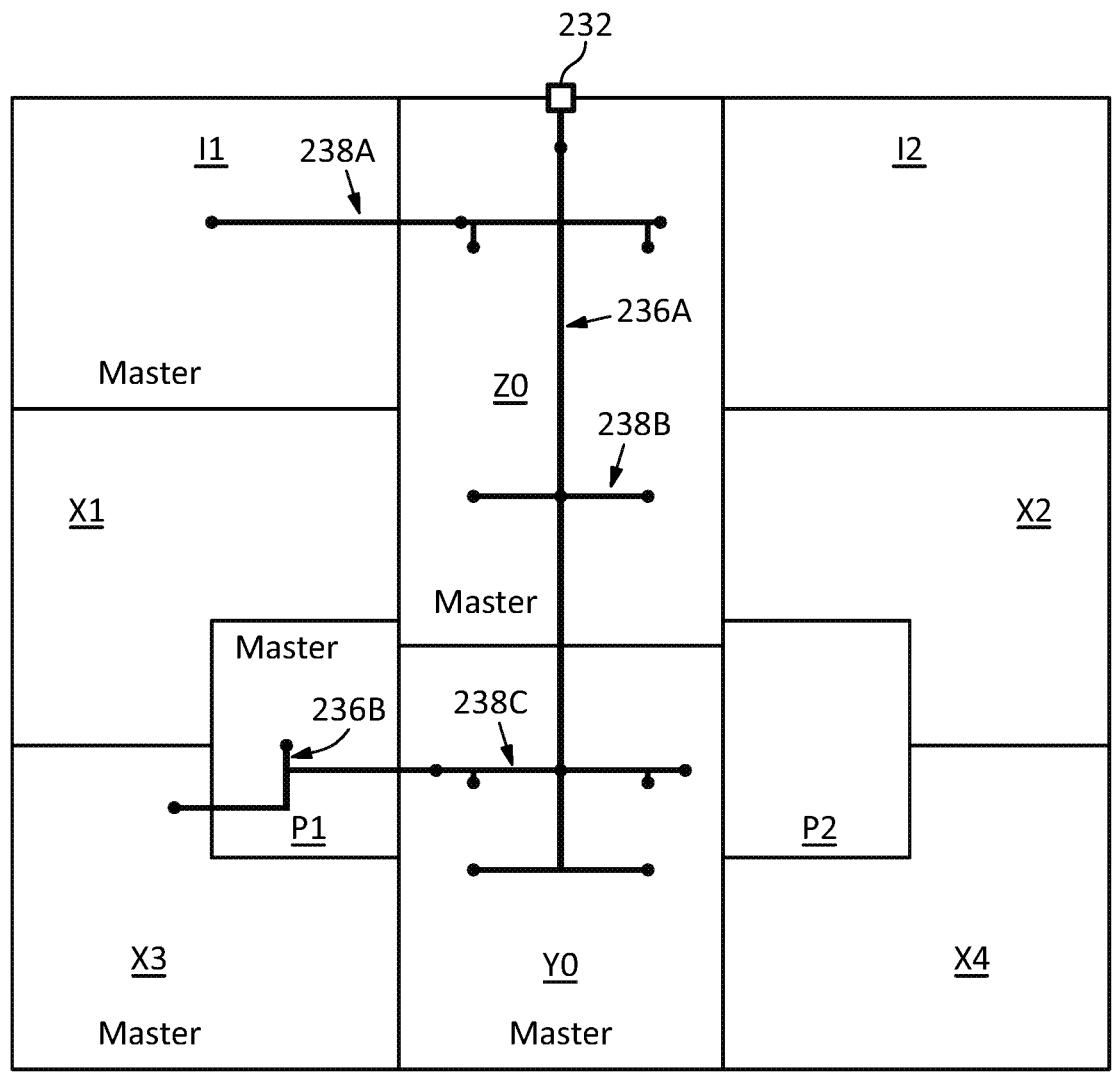
FIG. 7 illustrates the integrated circuit of FIG. 5 with a spine and main branches routed according to this disclosure.

At step 186, segments to construct the global clock tree may be routed based on topology information provided as constraints in the top-level configuration file. In this example embodiment, each tree may have a spine 236A and route segments (main branches) 238A, 238B, etc., that connect the spine to each placed clock cell as illustrated in FIG. 7, but other topologies may be used. Not all of the branches are indicated with reference numbers in FIG. 7 to prevent the drawing from becoming obscured. The user may specify any number of constraints in the configuration file for the clock tree routing such as spine direction, physical layer, spine offset, and others. As with the global clock tree cells, the segments may only be routed over master instances of blocks, both MIM and non-MIM blocks, because routes for non-master instances may be implemented through replication as explained below.

At this point, the method may proceed to two different, but non-exclusive processes. That is, the method may take both "branches" of the flowchart, in parallel, sequentially, or in any other manner.

The branch including steps 188, 190 and 192 may illustrate an example embodiment of a process, such as process 122 of FIG. 2 or process 136 of FIG. 3, which may perform timing analysis of the global clock tree.

Figure 8:
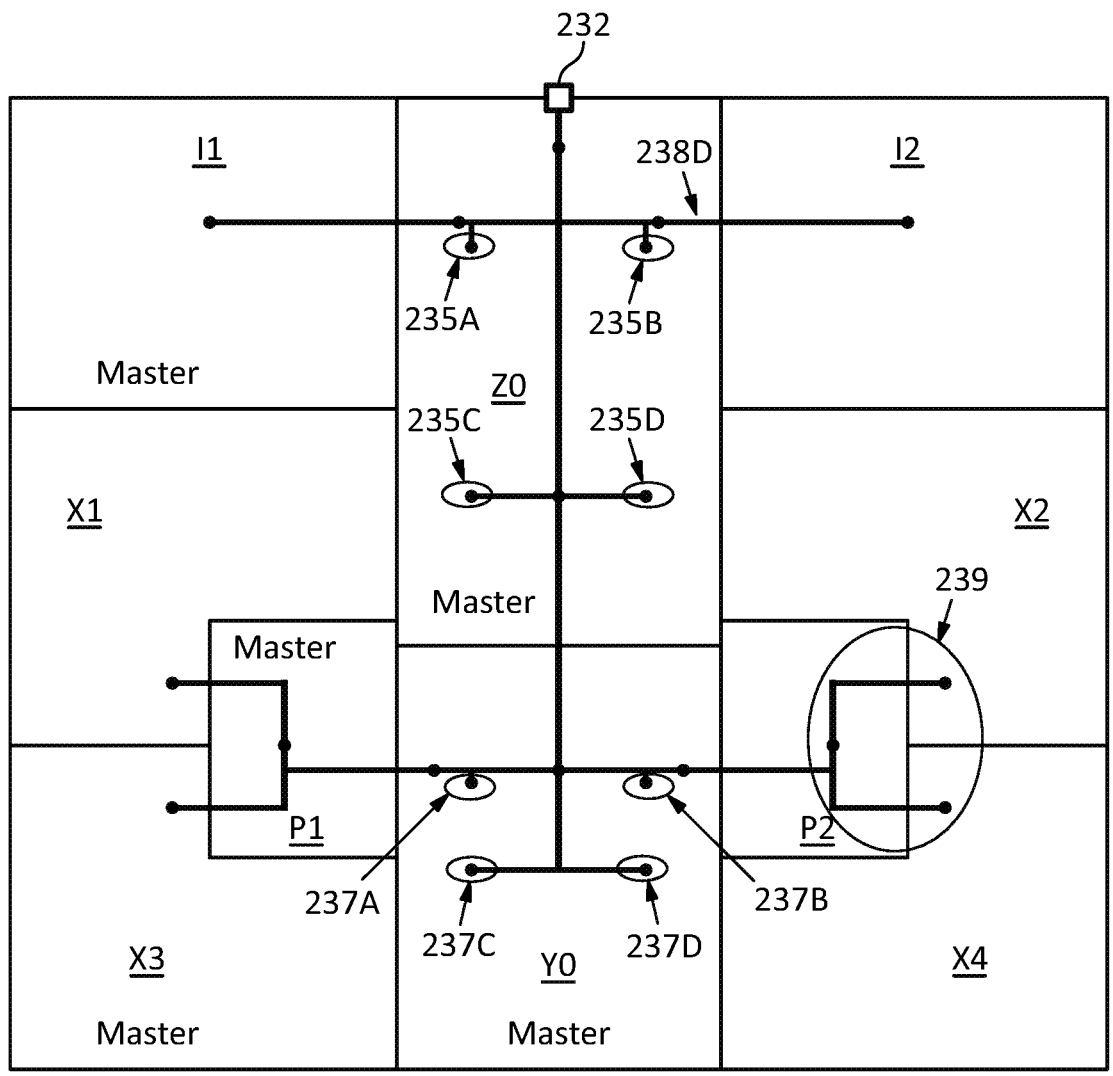
FIG. 8 illustrates the integrated circuit of FIG. 7 with cells and routes replicated in non-master instances of blocks according to this disclosure.

Starting at step 188, this process may create infrastructure for timing analysis by replicating the clock cell placement and segment routing over non-master instances of MIM blocks based on the cell placement and segment routing of the corresponding master MIM blocks as shown in FIG. 8. An example of cells and routes added through replication are shown at 239. The replication may be performed such that it preserves the cell placement and routing as though it had been constructed inside the non-master MIM blocks and then pulled up to the top level. In some instances, this may mean that additional clock tree segments are routed over non-MIM blocks. For example, segment 238D, which may have been added by replication, may cross over part of non-MIM block Z0 as well as MIM block I2. In some cases, net names may be reused, while in other cases, new unique net names may be created for the replicated segments. After the replication is completed, the global clock tree including cells and routes may be completed to each endpoint, which may include, for example a buffer as the clock cell. Such endpoint buffers may be referred to as CTS root buffers because they may function as the clock source or root of block-level clock trees that may be constructed in blocks that use CTS. In some other books, block-level clock trees may be constructed using other techniques. For example, block-level clock trees may be constructed using multi-source CTS (MSCTS) in blocks Z0 and Y0 because there may be multiple endpoints of the global clock tree in each of these blocks. In the example of FIG. 8, block Z0 may include four endpoints indicated by circles 235A, 235B, 235C and 235D which may be used as sources for MSCTS. Block Y0 may include four endpoints indicated by circles 237A, 237B, 237C and 237D which may be used as sources for MSCTS.

Figure 9:
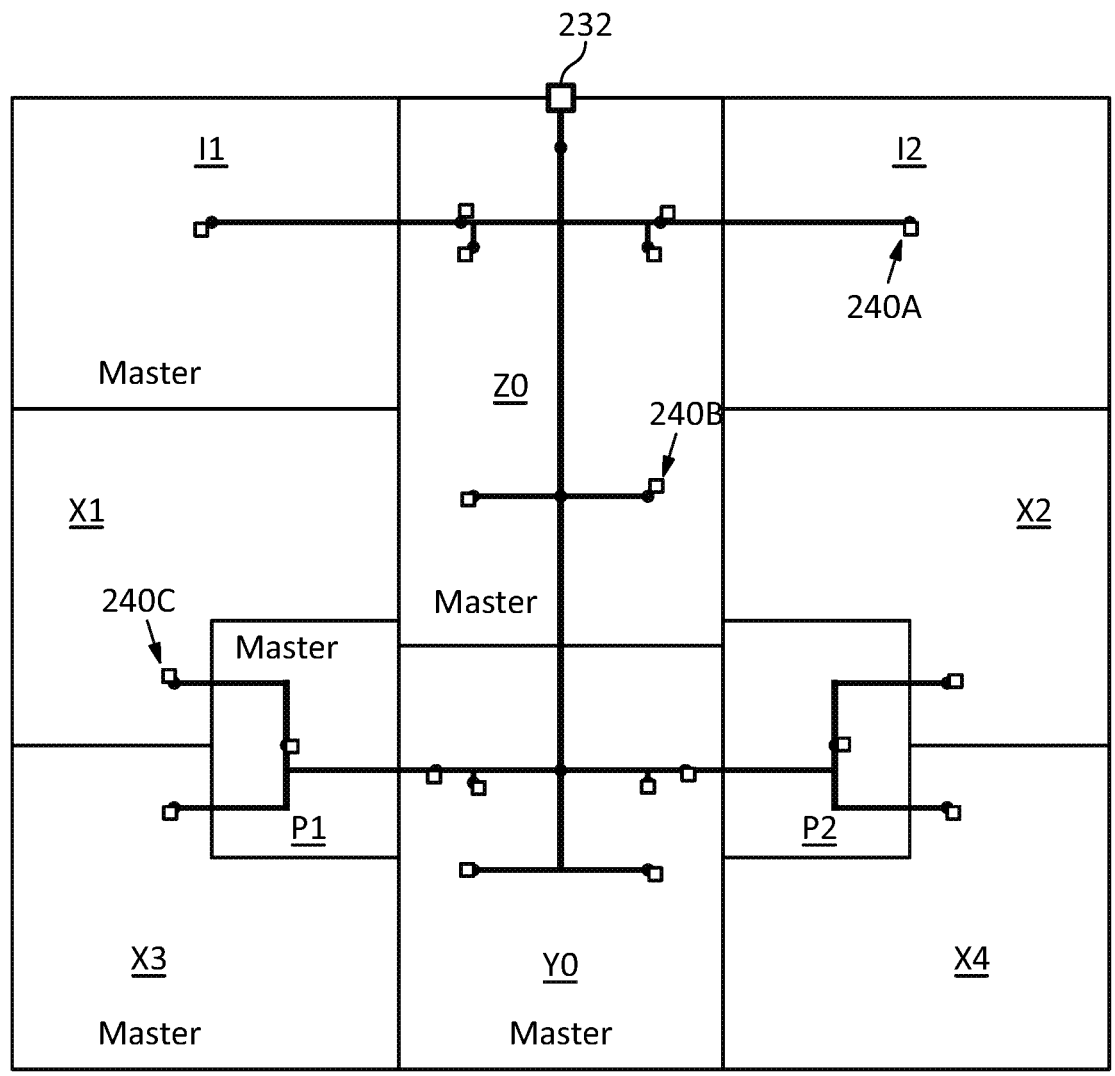
FIG. 9 illustrates the integrated circuit of FIG. 8 with clock sinks placed at or near endpoints of the global clock tree according to this disclosure.

At step 190, a dummy clock sink such as a flip-flop or other sequential logic load indicated by squares 240A, 240B, etc., may be added at or near each endpoint as shown in FIG. 9 to enable the EDA tool(s) to calculate the insertion delay from the clock root 232 to each endpoint. Not all of the sinks may be indicated with reference numbers in FIG. 9 to prevent the drawing from becoming obscured. Timing constraints, for example, top-level clock definitions, names, frequencies, etc. may be read in. A user may create scenarios, corners, and/or modes for the timing analysis. An exhaustive or nearly exhaustive list of scenarios may be created. After reading in the constraints and setting the clock to propagated mode, the insertion delays may be calculated for any relevant process, voltage and temperature (PVT) corners, as well as various operating scenarios and/or operating modes, to find the maximum insertion delay to each endpoint, as well as the skew between endpoints.

At step 192, these calculated latency and/or skew values for each endpoint may be saved in a timing report, for example, in a file 160 as shown in FIG. 3. At this point, the infrastructure created in steps 188 and 190 may be dismantled, for example, after the global clock tree is balanced and timing closure is achieved, or it may be retained for further use.

Referring again to step 186, the method may also take the branch including steps 196, 198, 200 and 202, which collectively may implement an example embodiment of a MIM handling process such as process 114 of FIG. 2 or process 132 of FIG. 3. In some embodiments, this may be viewed as a process for preparing MIM blocks for pushdown.

Starting with step 196, for routes that pass between master and non-master blocks, the portion of the route inside the master block may be replicated to the boundary, i.e., to the interface, between master and non-master blocks. This may include master blocks of both the MIM and Non-MIM types. This may be understood by reference to FIG. 10 which identifies locations 242A, 242B and 242C where routes pass between master and non-master blocks. At these locations, the non-master blocks may receive their routes and cells from their respective master blocks. However, on the master side of each interface, there may be a gap, i.e., the portion of the segment leading up to the boundary may be missing. Therefore, the routing segments 245A, 245B and 245C may be replicated at these locations as shown in FIG. 11. To replicate these segments, their orientations and locations may be used to compute transformation functions.

Figure 10:
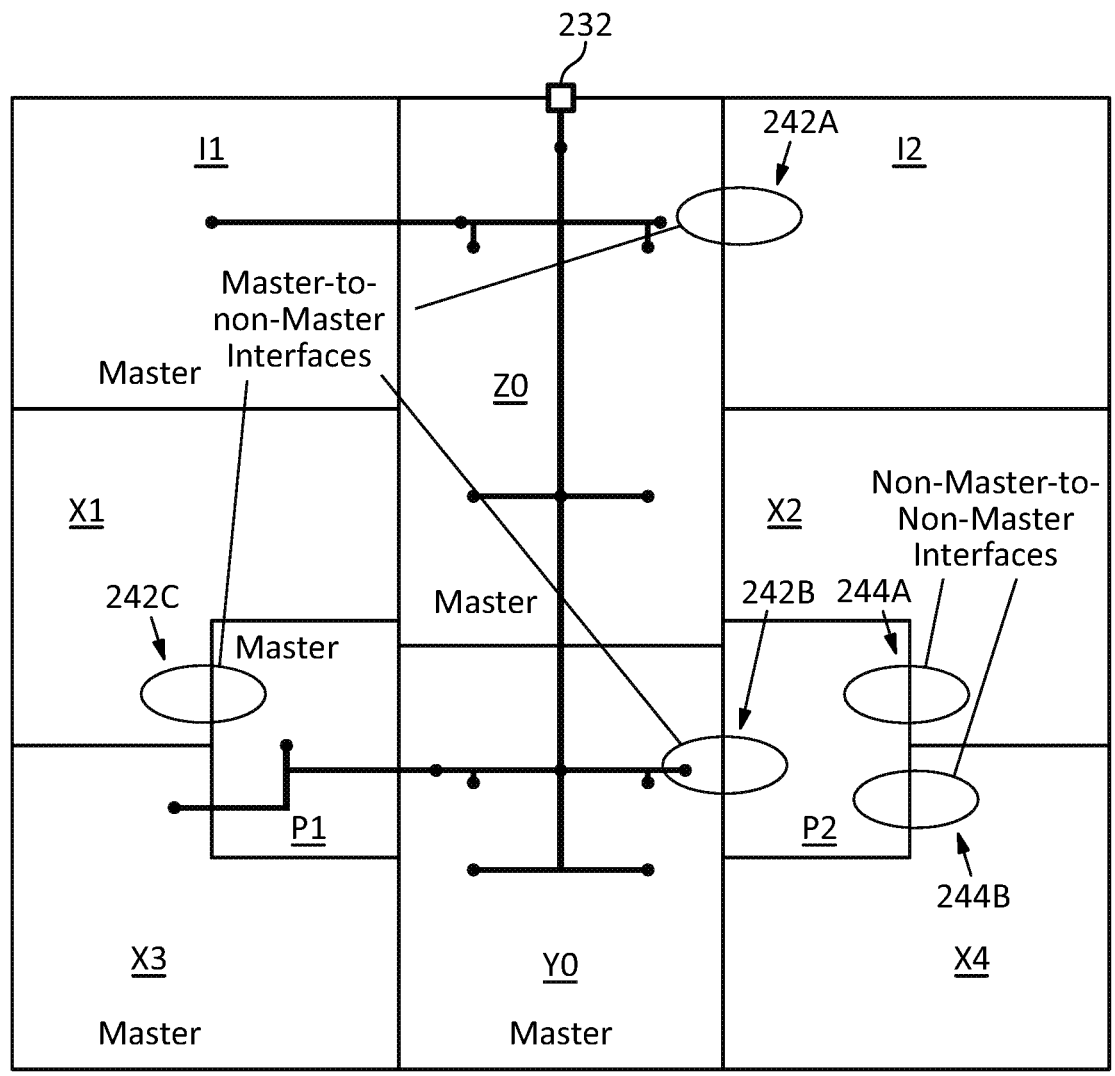
FIG. 10 illustrates the integrated circuit of FIG. 5 identifying locations of master to non-master interfaces and non-master to non-master interfaces according to this disclosure.
Figure 11:
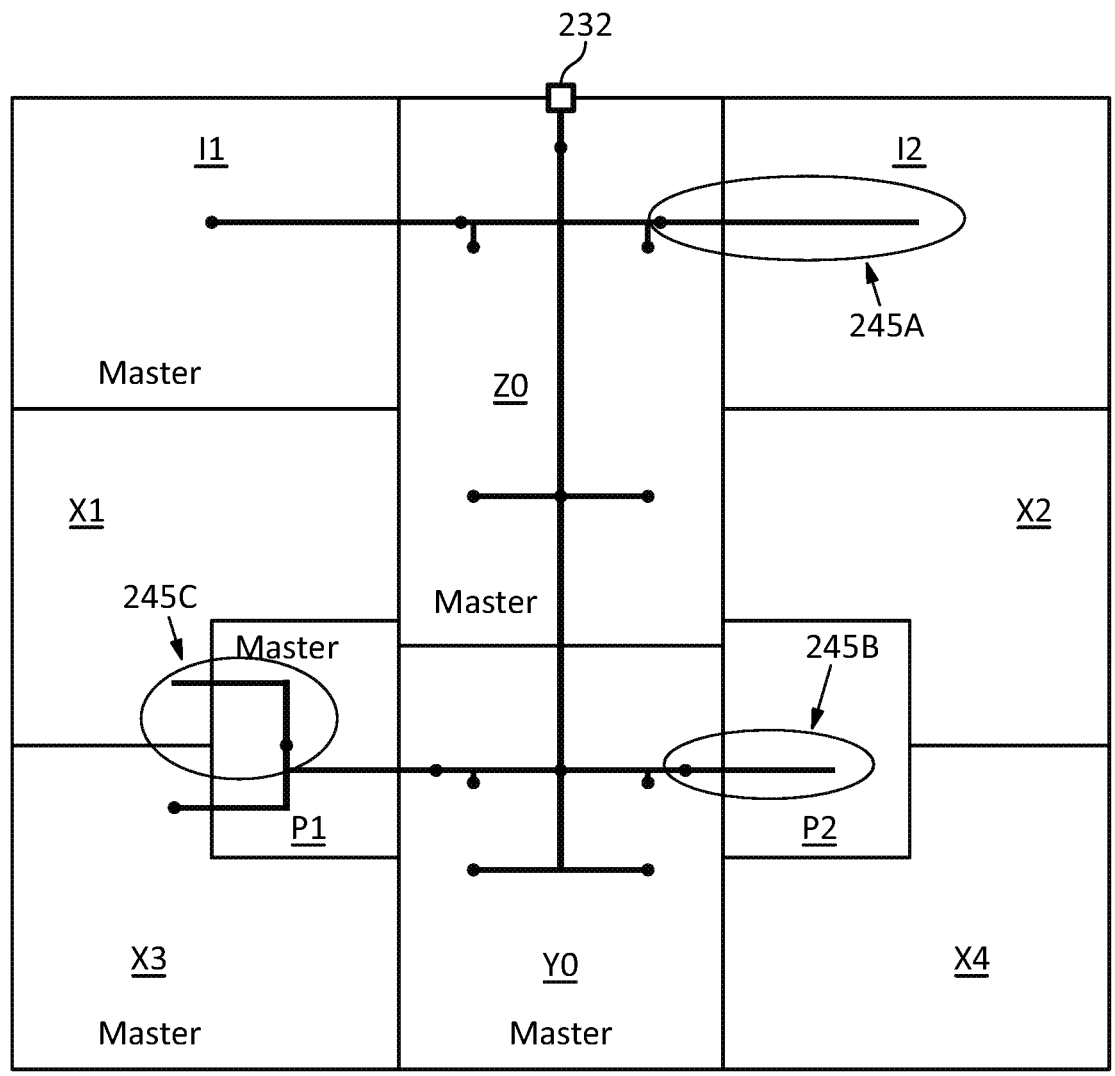
FIG. 11 illustrates the integrated circuit of FIG. 10 with replicated routes passing through master to non-master interfaces according to this disclosure.

FIG. 10 also identifies locations 244A and 244B where routes pass between non-master and non-master blocks. At these locations, both of the non-master blocks may receive their routes and cells from their respective master blocks, and therefore, no replication may be necessary.

At step 198, the routing from the interface segment to the nearest clock driver cell may be completed using route replication, for example by first auto-identifying the driver. Alternatively, clock driver cells may be assigned by the designer using the top-level configuration file.

At step 200, route segment nets may be renamed using new or existing nets because each new set of connected segments with a corresponding clock driver cell may need to be associated with a net name.

Figure 12:
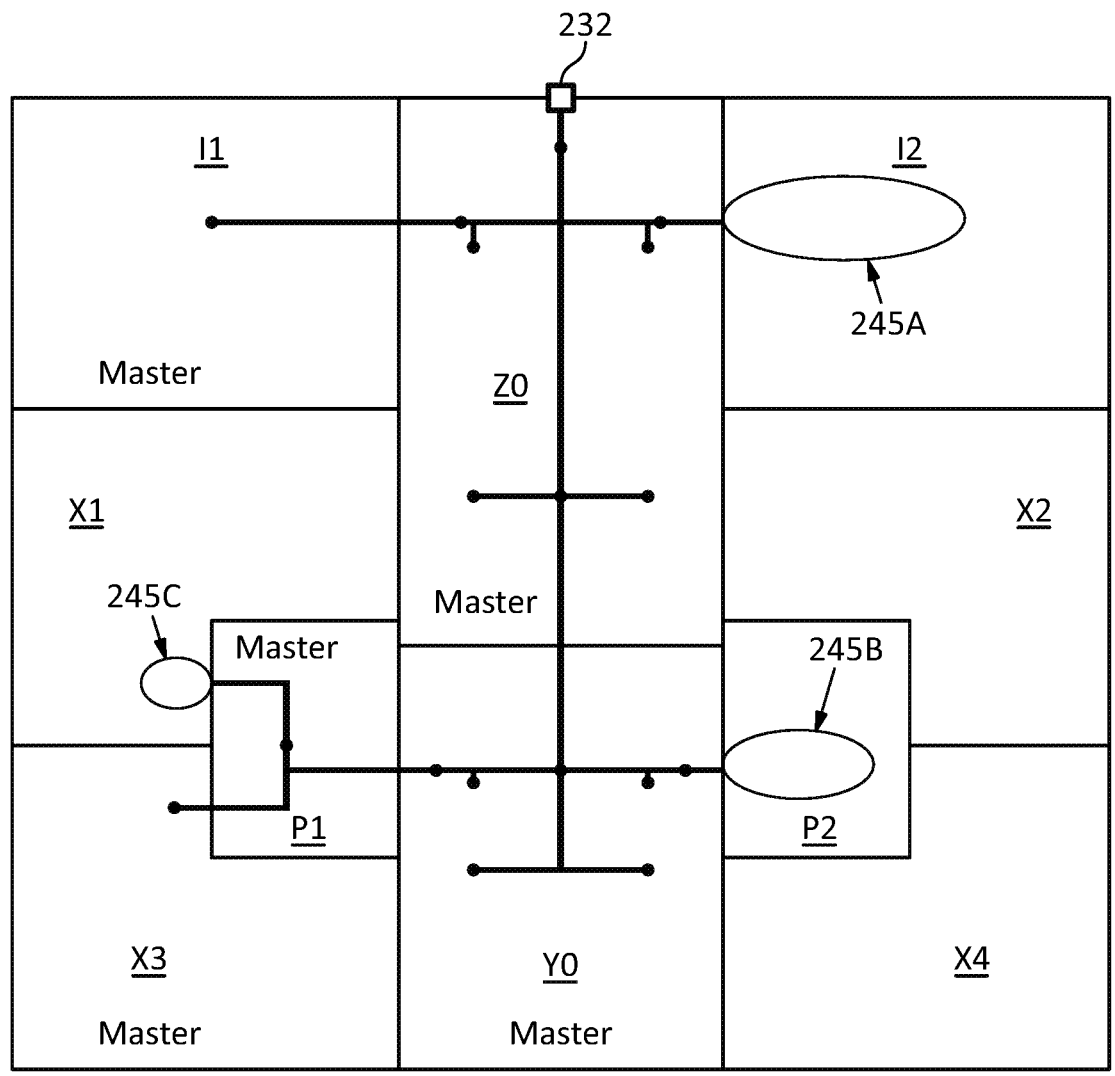
FIG. 12 illustrates the integrated circuit of FIG. 11 with replicated routes trimmed to the boundaries between master to non-master interfaces according to this disclosure.

At step 202, each of the replicated routes 245A, 245B and 245C may be trimmed at the boundary between the master and non-master blocks so that the replicated routes do not cross into the non-master instance as shown in FIG. 12. This may prevent duplicate routes and terminals from being created after pushdown. This, in turn, may prevent unnecessary power consumption caused by duplicate wires.

Figure 13:
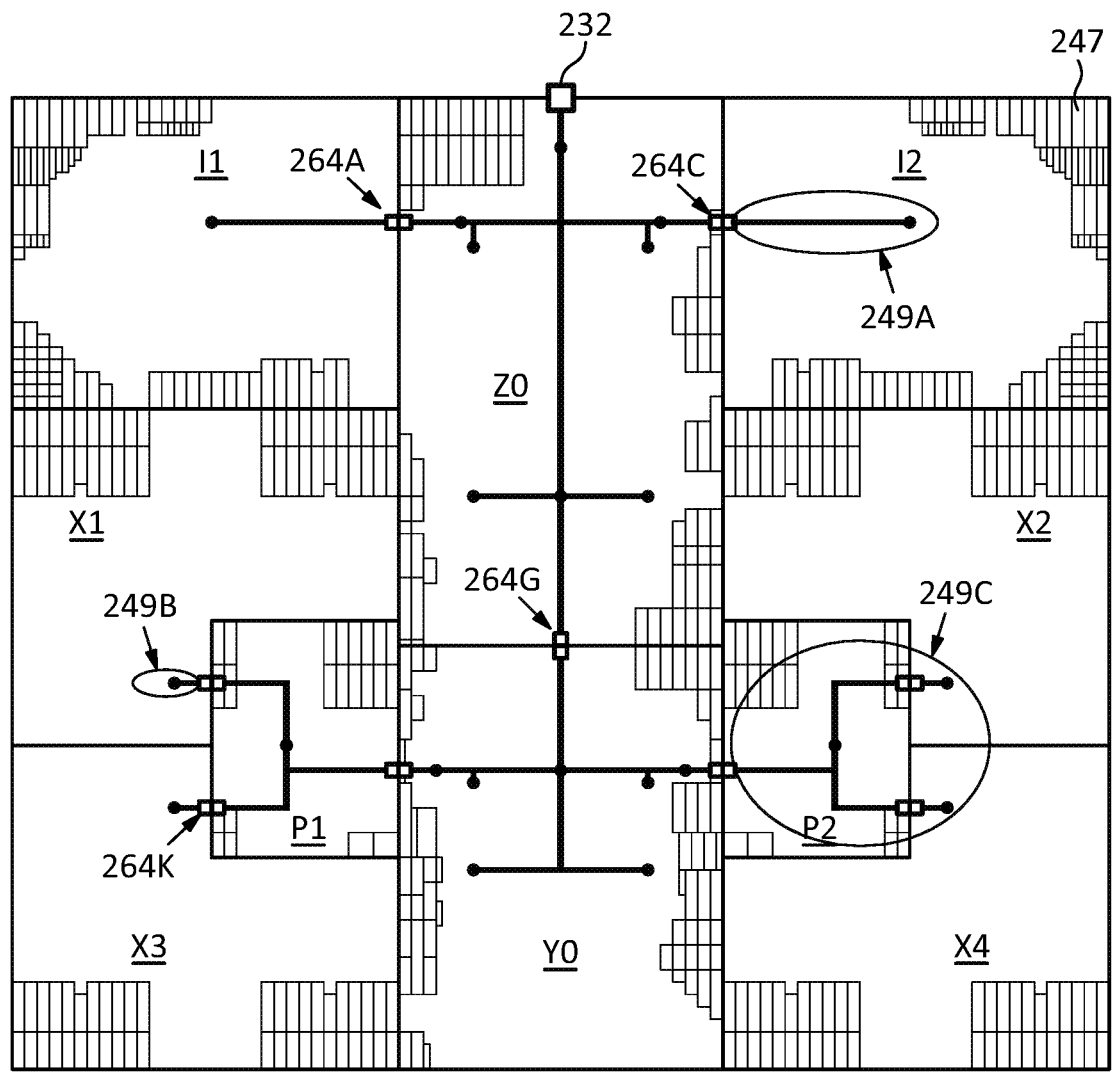
FIG. 13 illustrates the integrated circuit of FIG. 12 after pushdown according to this disclosure.
Figure 14:
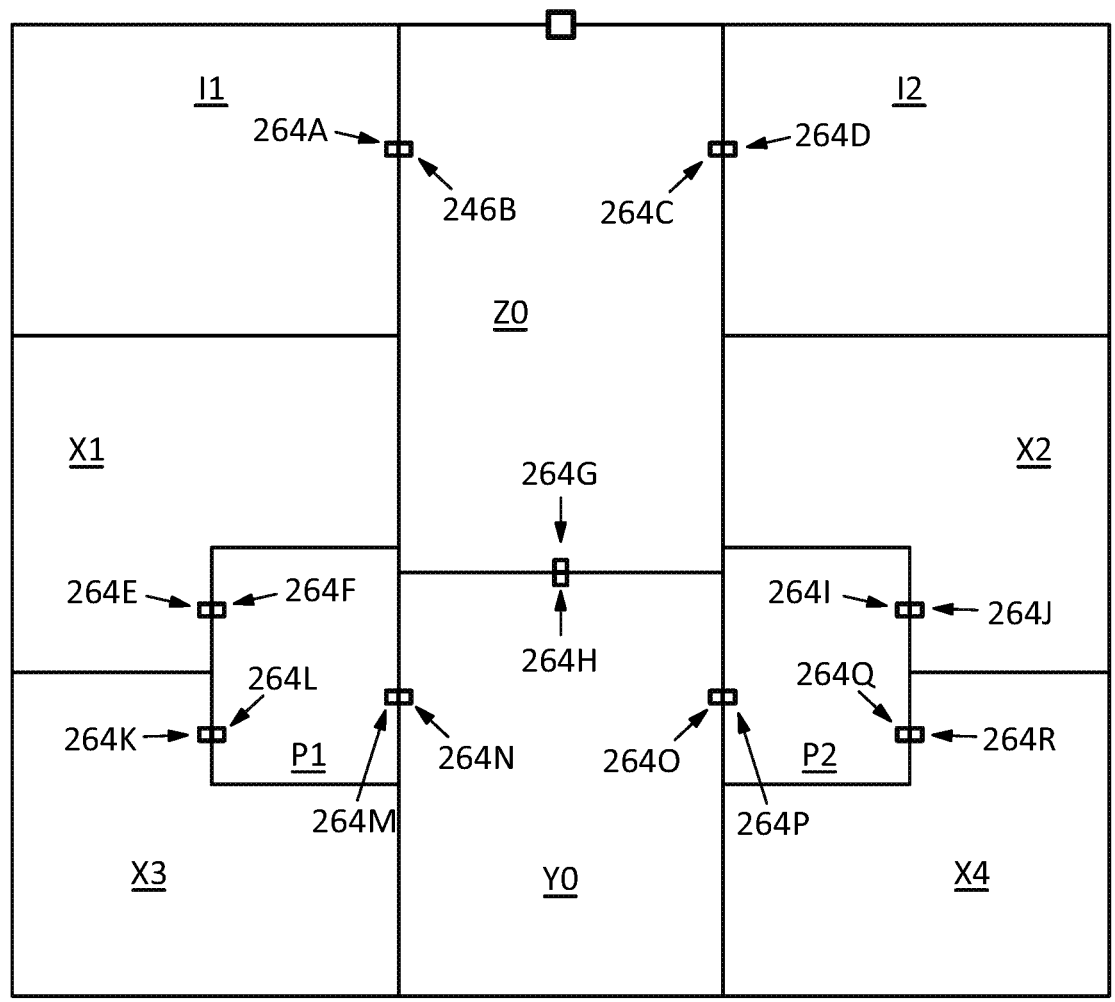
FIG. 14 illustrates the integrated circuit of FIG. 13 after with some details removed to better illustrate abutted clock terminals according to this disclosure.

At step 204, the global clock tree, including clock cells and routes, is pushed down from the top (parent) level into the (child-level) blocks as shown in FIG. 13. Replicated clock cells and routes are shown in non-master MIM blocks I2, X1, X2, X4 and P2. Abutting terminals 246A, 264B, 264C, etc., which are shown in FIGS. 13 and 14, are also created at the boundaries between abutting blocks after the pushdown. Not all of the components are indicated with reference numbers to prevent the drawing from becoming obscured. Examples of replicated clock cells (buffers) and routes after pushdown are shown at 249A, 249B and 249O. The fine structures 247 located around the peripheries of the blocks and/or subblocks may be macro cells that may be placed before any standard cells in the remaining area of each block or subblock. FIG. 14 illustrates the abutting terminals 246A, 264B, 2640, etc., with other details removed to more clearly illustrate the terminals.

At step 206, issues relating to terminal, port and/or pin names and/or configurations may be handled. The word terminal may be used to refer to a physical connection, whereas the word port may be used to refer to a logical connection. The word pin may be used to refer to a terminal or a port interchangeably.

For pure feed-through nets that pass through a block or other partition, multiple ports and/or terminals may be created after pushdown. In some situations, this may be problematic for some extraction and other tools. For example, a feed-through net may have two ports but only a straight physical connection between two terminals. An extraction tool may object to this and require a buffer between the two ports and terminals which may introduce unnecessary delay and power consumption. Therefore, ports and/or terminals may be renamed to overcome this type of problem and/or to make them compatible with existing block timing constraints. Multi-port, multi-terminal nets may be modified to single-port, multi-terminal for compatibility with extraction tools.

At step 208, a terminal file may be generated for each master block instance. A terminal file may include commands to create terminals for any or all ports of a block. This may prevent problems with terminal names because terminal names and orders, for example with single-port, multi-terminal nets, may not be preserved between the global clock tree and block-level clock trees.

At step 210, global clock tree cells that were placed at illegal locations, e.g., at step 184, may be legalized, that is, moved to legal placement locations. This may be performed for every partition that received part of the global clock tree. In the case of multiple instantiated blocks, the legalization may only need to be done for the master instance. Both the original location, i.e., the location specified by the user in the configuration file, and the legalized location may be recorded and output to the configuration file for each block.

At step 212, a configuration file may be created for each block. In the case of multiple instantiated blocks, a configuration file may only need to be created for the master instance. A block-level configuration file may include constraints such as cell locations, routing, spine information, layer information, and the like, which may be required to replicate the construction of the top-level global clock tree at the block level. Depending on the implementation details, this may enable the placement and routing to be replicated exactly at the block level. Since the constraints in the block-level configuration files may be independent of any netlists, it may be possible to save only the information needed to recreate the top-level global clock tree at the block level in the block-level configuration files. Depending on the implementation details, this may be visualized at a high level as pushing down the constraints rather than the actual cells, routes and nets. By implementing the block-level configuration files as user-modifiable files, it may provide a block-level clock tree designer the flexibility to explore tree configurations, customize the hierarchical tree and/or add more tree levels to improve the distribution of the clock signal.

At step 214, a top-level netlist and/or one or more block-level netlists may be modified to reflect the changes created by the pushdown, route replication, etc. The netlists may be modified, for example, by generating ECO files that modify the netlists and/or create block ports and terminals. The ECO files, when sourced on the original data, may be used to create a final results database.

Figure 15:
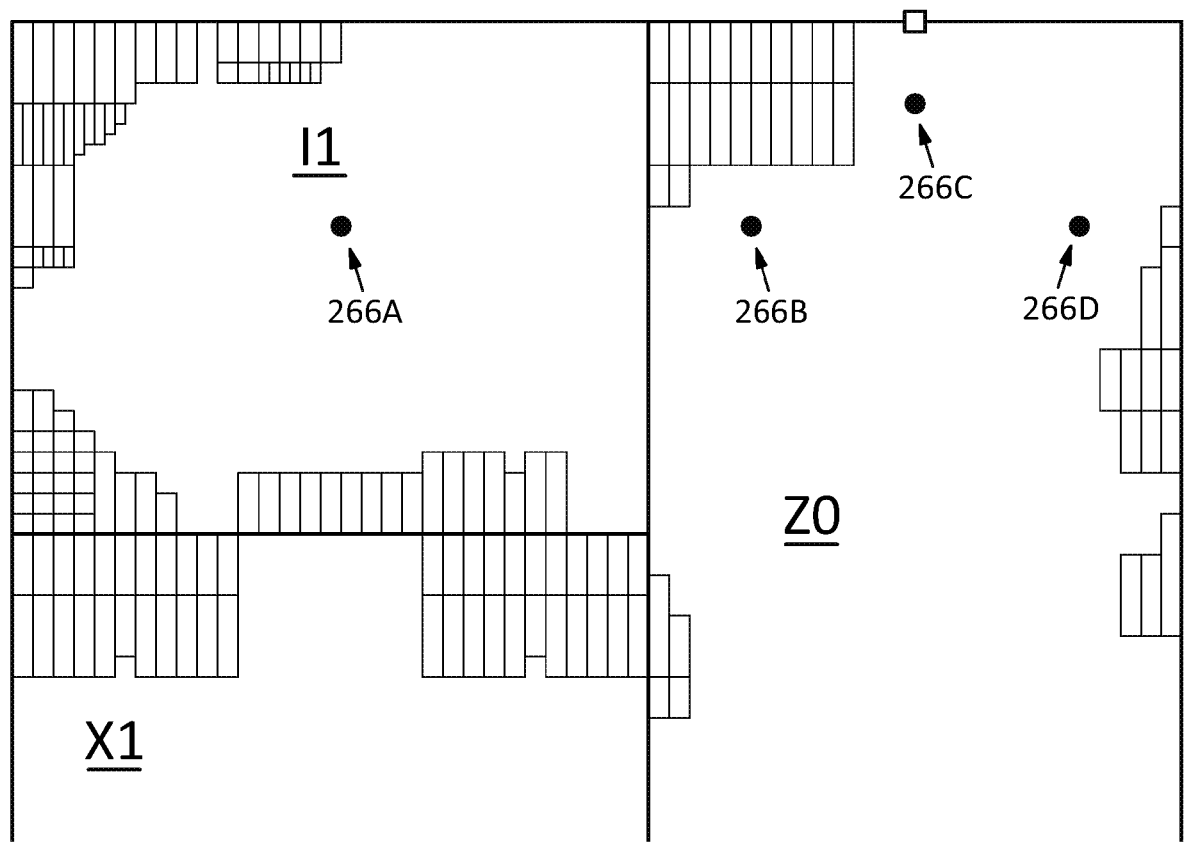
FIG. 15 illustrates an enlarged portion of the integrated circuit of FIG. 13 to show placement and routing blockages according to this disclosure.

At step 216, placement and/or routing blockages may be created to prevent placement of other cells at locations occupied by pushed down cells (e.g., buffers) as shown in FIG. 15. Examples of placement and/or routing blockages are shown at 266A, 266B, 266C, etc. In cases where cells that were placed inside blocks no longer exist, this is, they have been replaced with constraints such as cell location and routing in the block-level configuration files, placement may be used to prevent other cells from being placed at these locations. For large driver cells, blockages may be added to model the cell blockage for global routing and/or to prevent large cell displacement and/or design check (DRC) violations. The placement and routing blockages may be added to the final results database.

At step 218, the block-level configuration files and terminal files may be used for implementing block-level clock tree construction. For each block, this may include the portions of the global clock tree that have been pushed down into each block, as well as block-level clock trees that may be constricted using CTS, MSCTS, etc., starting from the endpoints of the global clock tree.

At step 220, the EGO files generated at step 214 and the final database containing placement and routing blockages may be used as feedback to modify the top-level configuration file to reflect the changes that have been made to the Hierarchical clock tree.

The principles described herein may provide an automated process for constructing a global clock tree while enabling a clock tree designer to maintain manual control over the automated process. The principles of this disclosure may lead to predictable, repeatable and high quality clock tree designs. Moreover, the principles may be scaled to use with hierarchical custom clock tree designs at any level including the chip level or any other hierarchical level. The principles may also be design and technology independent, and thus may be used across multiple technologies and designs. The principles of this disclosure may also reduce the time and cost required to design a hierarchical clock tree.

The embodiments disclosed above have been described in the context of various implementation details, but the principles of this disclosure are not limited these or any other specific details. For example, some files are described as individual or multiple files, but in other embodiments, and/or depending on the implementation details, more or fewer files may be used. The EDA platform 140 illustrated in FIG. 3 is illustrated as a unitary system, but its functionality may be distributed between different systems and components in different locations and having various user interfaces.

Some of the structures that have been described as a global clock tree may also be referred to as a clock distribution network or a top-level clock tree depending on the implementation details. Some data structures have generally been described as files, but the term file may also include any other data structures such as data blocks, data streams, etc., that may provide information relating to the particular process, method, step structure, etc.

Figure 16:
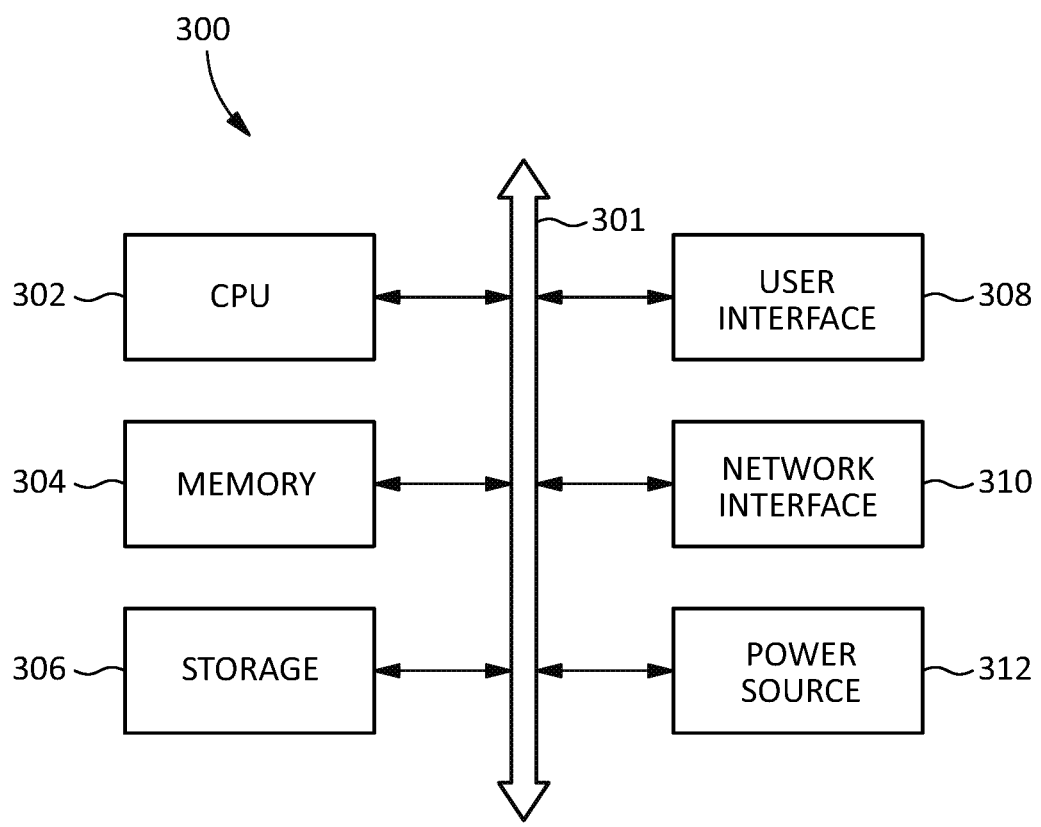
FIG. 16 illustrates an embodiment of a computing system according to this disclosure.

FIG. 16 illustrates an embodiment of a computing system according to this disclosure. The system 300 of FIG. 16 may be used to implement any or all of the methods and/or apparatus described in this disclosure. The system 300 may include a central processing unit (CPU) 302, memory 304, storage 306, user interface 308, network interface 310, and power source 312. In different embodiments, the system may omit any of these components or may include duplicates, or any additional numbers of, any of the components, as well as any other types of components to implement any of the methods and/or apparatus described in this disclosure.

The CPU 302 may include any number of cores, caches, bus and/or interconnect interfaces and/or controllers. The Memory 304 may include any arrangement of dynamic and/or static RAM, nonvolatile memory (e.g., flash memory) etc. The storage 306 may include hard disk drives (HDDs), solid state drives (SSDs), and/or any other type of data storage devices or any combination thereof. The user interface 308 may include any type of human interface devices such as keyboards, mice, monitors, video capture or transmission devices, microphones, speakers touchscreens, etc. as well as any virtualized or remote versions of such devices. The network interface 310 may include one or more adapters or other apparatus to communicate through Ethernet, Wi-Fi, Bluetooth, or any other computer networking arrangement to enable the components to communicate through physical and/or logical networks, such as an intranet, the Internet, local area networks, wide area networks, etc. The power source 312 may include a battery and/or a power supply capable of receiving power from an AC or DC power source and converting it to any form suitable for use by the components of system 300.

Any or all of the components of the system 300 may be interconnected through a system bus 301 which may collectively refer to various interfaces including power buses, address and data buses, high-speed interconnects such as SATA, PCI, PCI-e, SMB, and any other types of interfaces that may enable the components to work together, either locally at one location, and/or distributed between different locations.

The system 300 may also include various chipsets, interfaces, adapters, glue logic, embedded controllers, such as programmable or non-programmable logic devices or arrays, application specific integrated circuits (ASICs), embedded computers, smart cards, and the like, arranged to enable the various components of the system 300 to work together to implement any of the all of the methods and/or apparatus described in this disclosure. Any of the components of the system 300 may be implemented with hardware, software, firmware, or any combination thereof. In some embodiments, any or all of the components may be realized in a virtualized form and/or in a cloud-based implementation with flexible provisioning of resources, for example within a data center, or distributed throughout multiple data centers.

The blocks or steps of a method or algorithm and functions described in connection with the embodiments disclosed herein may be embodied directly in hardware, in a software module executed by a processor, or in a combination of the two, including in the system 300. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium.

Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. Likewise, pushing a clock tree to a level may refer to pushing all or just a portion of the try to a level.

The use of terms such as "first" and "second" in this disclosure and the claims may only be for purposes of distinguishing the things they modify and may not to indicate any spatial or temporal order unless apparent otherwise from context.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method of automatically constructing a hierarchical clock tree for an integrated circuit, the method comprising:
constructing a global clock tree on a first level based on first-level constraints;

pushing at least a portion of the global clock tree including one or more clock cells of the global clock tree into one or more partitions on a second level; and generating second-level constraints for the one or more partitions on the second level.

2. The method of claim 1, wherein the second-level constraints include information for replicating multiple instantiated partitions on the second level.

3. The method of claim 1, further comprising modifying one or more terminal names after pushdown.

4. The method of claim 1, further comprising modifying one or more terminal configurations after pushdown.

5. The method of claim 1, further comprising generating configuration files including the second-level constraints for the one or more partitions on the second level.

6. The method of claim 1, wherein the first-level constraints are included in a first-level configuration file that is user-modifiable.

7. The method of claim 1, further comprising creating infrastructure to analyze timing of the global clock tree.

8. The method of claim 7, wherein creating the infrastructure comprises replicating one or more cells and one or more routes for multiple instance partitions.

9. The method of claim 8, wherein creating the infrastructure further comprises adding clock sinks near endpoints of the global clock tree.

10. The method of claim 9, further comprising calculating timing for the endpoints of the global clock tree based on the first-level constraints.

11. The method of claim 10 wherein calculating timing for the endpoints comprises calculating latency.

12. The method of claim 10 wherein calculating timing for the endpoints comprises calculating skew.

13. The method of claim 1, wherein:
the first level is a top level; and
the second level is a block level.

14. The method of claim 1, wherein the method is performed in a user-interactive mode.

15. The method of claim 1, wherein constructing the global clock tree on the first level based on first-level constraints comprises:
placing clock cells for the global clock tree on the first level based on the first-level constraints;
modifying a first-level netlist to include new nets for the clock cells; and
routing segments for the global clock tree based on the first-level constraints.

16. A method of automatically constructing a hierarchical clock tree for an integrated circuit, the method comprising:
placing cells for a global clock tree on a first level based on first-level constraints;
routing segments for the global clock tree on the first level based on the first-level constraints;
creating clock routes for one or more multiple instantiated partitions on a second level based on the global clock tree;
pushing at least a portion of the global clock tree including one or more clock cells of the global clock tree into one or more partitions on the second level; and
generating second-level constraints for the global clock tree in the one or more partitions on the second level, including the one or more multiple instantiated partitions.

17. The method of claim 16, wherein creating clock routes for the one or more multiple instantiated partitions further comprises replicating route segments that cross from one or more non-master partitions to one or more master partitions.

18. The method of claim 17, wherein creating clock routes for the one or more multiple instantiated partitions further comprises renaming route segments that cross from non-master to master partitions.

19. The method of claim 17, wherein creating clock routes for the one or more multiple instantiated partitions further comprises trimming route segments to prevent the route segments from passing into one or more non-master MIM instances.

20. A method of constructing a hierarchical clock tree for an integrated circuit, the method comprising:
placing cells based on a global clock tree distribution topology with constraints;
generating routes based on the global clock tree distribution topology with constraints;
pushing at least a portion of the cells and routes of the global clock tree distribution topology from a first level into one or more partitions on a second level; and
implementing the global clock tree on the second level using engineering change orders (ECOs).

* * * * *